US011461376B2

(12) United States Patent
Liu et al.

(10) Patent No.: US 11,461,376 B2
(45) Date of Patent: Oct. 4, 2022

(54) KNOWLEDGE-BASED INFORMATION RETRIEVAL SYSTEM EVALUATION

(71) Applicant: International Business Machines Corporation, Armonk, NY (US)

(72) Inventors: Zhe Liu, San Jose, CA (US); Peifeng Yin, San Jose, CA (US); Jalal Mahmud, San Jose, CA (US); Rama Kalyani T. Akkiraju, Cupertino, CA (US); Yufan Guo, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 464 days.

(21) Appl. No.: 16/507,770

(22) Filed: Jul. 10, 2019

(65) Prior Publication Data

US 2021/0011933 A1 Jan. 14, 2021

(51) Int. Cl.
*G06F 16/33* (2019.01)
*G06F 16/332* (2019.01)
(Continued)

(52) U.S. Cl.
CPC ........ *G06F 16/3344* (2019.01); *G06F 16/316* (2019.01); *G06F 16/3329* (2019.01); *G06F 16/3334* (2019.01); *G06N 5/022* (2013.01)

(58) Field of Classification Search
CPC ............. G06F 16/3344; G06F 16/3329; G06F 16/316; G06F 16/3334; G06F 16/31;
(Continued)

(56) References Cited

U.S. PATENT DOCUMENTS 9,904,675 B2 2/2018 Kantor et al.
10,331,402 B1* 6/2019 Spector ................. G06F 16/951
(Continued)

OTHER PUBLICATIONS

Chorowski et al, Towards better decoding and language model integration in sequence to sequence models, Interspeech, pp. 1-6. (Year: 2017).*

(Continued)

*Primary Examiner* — Cheyne D Ly
(74) *Attorney, Agent, or Firm* — Troutman Pepper Hamilton Sanders LLP (57) ABSTRACT

Embodiments provide a computer implemented method of evaluating one or more IR systems, the method including: providing, by a processor, a pre-indexed knowledge-based document to a pre-trained sentence identification model; identifying, by the sentence identification model, a predetermined number of query-worthy sentences from the pre-indexed knowledge-based document, wherein the query-worthy sentences are ranked based on a prediction probability value of each query-worthy sentence; providing, by the sentence identification model, the query-worthy sentences to a pre-trained query generation model; generating, by the query generation model, a query for each query-worthy sentence; and evaluating, by the processor, the one or more IR systems using the generated queries, wherein one or more searches are performed via the one or more IR systems, and the one or more searches are performed in a set of knowledge-based documents including the pre-indexed knowledge-based document.

11 Claims, 5 Drawing Sheets

(51) Int. Cl.
   *G06N 5/02* (2006.01)
   *G06F 16/31* (2019.01)
(58) Field of Classification Search
   CPC .......... G06N 5/022; G06N 20/10; G06N 3/08;
              G06N 3/0454; G06N 3/0445; G06K
              9/6256; G06K 9/6269
   See application file for complete search history.

(56) References Cited

U.S. PATENT DOCUMENTS

| | | | | |
|---|---|---|---|---|
| 2005/0114306 | A1* | 5/2005 | Shu | G06F 16/9535 |
| 2007/0260650 | A1* | 11/2007 | Warner | G06F 16/80 |
| 2009/0281870 | A1* | 11/2009 | Sun | G06Q 30/0282 |
| | | | | 705/7.29 |
| 2009/0287630 | A1* | 11/2009 | Kaiser | G06N 5/02 |
| | | | | 706/50 |
| 2011/0202559 | A1* | 8/2011 | Stiers | G06F 16/80 |
| | | | | 707/771 |
| 2013/0218678 | A1* | 8/2013 | Benyamin | G06Q 30/0255 |
| | | | | 705/14.53 |
| 2013/0346356 | A1* | 12/2013 | Welinder | G06F 16/285 |
| | | | | 706/52 |
| 2014/0337254 | A1* | 11/2014 | Chen | G06N 5/04 |
| | | | | 706/12 |
| 2016/0342895 | A1 | 11/2016 | Gao et al. | |
| 2017/0061330 | A1* | 3/2017 | Kurata | G06F 16/3344 |
| 2018/0046938 | A1 | 2/2018 | Allen et al. | |

OTHER PUBLICATIONS

D'Haro et al., Learning to Predict the Adequacy of Answers in Chat-Oriented Humanagent Dialogs, Proc. of the 2017 IEEE Region 10 Conference (TENCON), Malaysia, Nov. 5-8, 2017, pp. 455-460. (Year: 2017).*

Harvey, F., To Volunteer or to Contribute Locational Information? Towards Truth in Labeling for Crowdsourced Geographic Information, Daniel Sui • Sarah Elwood • Michael Goodchild Editors, pp. 1-393, especially, pp. 31-42, Springer. (Year: 2013).*

Voorhees, E. M. (Sep. 2001). The philosophy of information retrieval evaluation. In Workshop of the Cross-Language Evaluation Forum for European Languages (pp. 355-370). Springer, Berlin, Heidelberg.

Hersh, W., Pentecost, J., & Hickam, D. (1996). A task-oriented approach to information retrieval evaluation. JASIS, 47(1), 50-56.

Grady, C., & Lease, M. (Jun. 2010). Crowdsourcing document relevance assessment with mechanical turk. In Proceedings of the NAACL HLT 2010 workshop on creating speech and language data with Amazon's mechanical turk (pp. 172-179). Association for Computational Linguistics.

Cleverdon, C. W., & Keen, M. (1966). Aslib Cranfield research project-Factors determining the performance of indexing systems; vol. 2, Test results.

Sanderson, M. (2010). Test collection based evaluation of information retrieval systems. Foundations and Trends® in Information Retrieval, 4(4), 247-375.

Lee, C. J., & Croft, W. B. (Aug. 2012). Generating queries from user-selected text. In Proceedings of the 4th Information Interaction in Context Symposium (pp. 100-109). ACM.

Mannem, P., Prasad, R., & Joshi, A. (Jun. 2010). Question generation from paragraphs at UPenn: QGSTEC system description. In Proceedings of QG2010: The Third Workshop on Question Generation (pp. 84-91).

Chah, N. (2018). OK Google, What is Your Ontology? Or: Exploring Freebase Classification to Understand Google's Knowledge Graph. arXiv preprint arXiv:1805.03885.

Yahya, M., Berberich, K., Elbassuoni, S., Ramanath, M., Tresp, V., & Weikum, G. (Jul. 2012). Natural language questions for the web of data. In Proceedings of the 2012 Joint Conference on Empirical Methods in Natural Language Processing and Computational Natural Language Learning (pp. 379-390). Association for Computational Linguistics.

Lindberg, D., Popowich, F., Nesbit, J , & Winne, P. (2013). Generating natural language questions to support learning on-line. In Proceedings of the 14th European Workshop on Natural Language Generation (pp. 105-114).

Mazidi, K., & Nielsen, R. D. (2014). Linguistic considerations in automatic question generation. In Proceedings of the 52nd Annual Meeting of the Association for Computational Linguistics (vol. 2: Short Papers) (vol. 2, pp. 321-326).

Yuan, X., Wang, T., Gulcehre, C., Sordoni, A., Bachman, P., Subramanian, S., . . . & Trischler, A. (2017). Machine comprehension by text-to-text neural question generation. arXiv preprint arXiv:1705.02012.

Zhou, Q., Yang, N., Wei, F., Tan, C., Bao, H., & Zhou, M. (Nov. 2017). Neural question generation from text: A preliminary study. In National CCF Conference on Natural Language Processing and Chinese Computing (pp. 662-671). Springer, Cham.

Tan, Ying Hua, et al., "phi-LSTM: a Phrase-based Hierarchical LSTM Model for Image Captioning," Asian Conference on Computer Vision, pp. 101-117, Springer, Cham, 2016.

Bernardi, Raffaella, et al., "Automatic Description Generation from Images: A Survey of Models, Datasets, and Evaluation Measures," Journal of Artificial Intelligence Research 55, 2016, pp. 409-442.

* cited by examiner

David Beckham

David Robert Joseph Beckham, OBE (UK: /ˈbɛkəm/; born 2 May 1975) is an English retired professional footballer, the current president of Inter Miami CF, and co-owner of Salford City. He played for Manchester United, Preston North End, Real Madrid, Milan, LA Galaxy, Paris Saint-Germain and the England national team, for which he held the appearance record for an outfield player until 2016. He is the first English player to win league titles in four countries: England, Spain, the United States and France. He retired in May 2013 after a 20-year career, during which he won 19 major trophies.

Known for his range of passing, crossing ability and bending free-kicks as a right winger, Beckham has been hailed as one of the greatest midfielders of all time. He was runner-up in the Ballon d'Or, twice runner-up for FIFA World Player of the Year and in 2004 was named by Pelé in the FIFA 100 list of the world's greatest living players. He was inducted into the English Football Hall of Fame in 2008. A global ambassador for the sport, Beckham is regarded as a British cultural icon.

In 1997, Beckham started dating Victoria Adams, after she attended a Manchester United match. She was famously known as "Posh Spice" of the pop music group Spice Girls, one of the world's top pop groups at the time, and his team was also enjoying a great run of success. Therefore, their relationship instantly attracted a great deal of media attention. The couple were dubbed "Posh and Becks" by the media. He proposed to her on 24 January 1998 in a restaurant in Cheshunt, England.

On 4 July 1999, they married at Luttrellstown Castle in Ireland. Beckham's teammate Gary Neville was the best man, and the couple's infant son, Brooklyn, was the ring bearer. The media were kept away from the ceremony, as the Beckhams had an exclusive deal with OK! Magazine, but newspapers were still able to obtain photographs showing them sitting on golden thrones. 437 staff were employed for the wedding reception, which was estimated to have cost £500,000.

David and Victoria Beckham have four children: sons Brooklyn Joseph (born 4 March 1999 at Portland Hospital, London),Romeo James (born 1 September 2002 at Portland Hospital, London), Cruz David (born 20 February 2005 at Ruber International Hospital, Madrid),and daughter Harper Seven (born 10 July 2011 at Cedars-Sinai Medical Center, Los Angeles). Elton John is godfather to Brooklyn and Romeo Beckham; their godmother is Elizabeth Hurley. Beckham's three sons have all played football in the Arsenal Academy. Like their father, Brooklyn and Romeo have both done modelling work and been named among GQ's best dressed British men. Brooklyn previously played football for Arsenal U16,but was released at the end of the 2014–15 season.

KNOWLEDGE-BASED INFORMATION RETRIEVAL SYSTEM EVALUATION

TECHNICAL FIELD

The present disclosure relates generally to a system, method, and computer program product that can evaluate one or more information retrieval (IR) systems via auto-generated natural language queries.

BACKGROUND

In general, information retrieval (IR) systems help users to rapidly locate relevant information from a repository of indexed contents, such as web pages, documents, books, etc. There is a type of IR system, i.e., a knowledge-based IR system, which can answer questions or identify relevant factual knowledge through searching indexed knowledge base, such as Wikipedia and DBpedia. Advances in the technology of IR systems require development of a more automated evaluation method with a larger test set, such that more meaningful comparisons among existing algorithms can be performed.

Existing evaluation methods of IR systems can be separated into two categories: a user-based evaluation, and a system evaluation. In the user-based evaluation, test subjects (e.g., users) are requested to perform searches using a plurality of different IR systems and decide which IR system has a better performance. The user-based evaluation focuses more on the overall outcome of IR systems, such as how well each IR system enables a user to answer a question or meet an information need. However, the user-based evaluation is time-consuming and expensive. It is also subjected to a high risk of being done inaccurately due to, e.g., subjects training, subjectivity, co-variances added into the evaluation process. Compared to the user-based evaluation, the system evaluation is more automated and less expensive. The system evaluation requires a corpus of documents, a set of queries, and a set of relevance judgments including a list of query-document pairs, detailing relevancy of the query-document pairs manually assessed by human experts in advance. One problem for the system evaluation approach is that test queries are generally not manually created. In other words, the test queries are not written in natural language. For instance, titles simulating keyword queries, and description and narratives simulating long queries are created with a very formal language in the context of a particular document. The test queries in the formal language are different from manually created test queries in natural language.

Thus, a new evaluation approach which can evaluate IR systems via auto-generated natural language queries is desired.

SUMMARY

A computer implemented method in a data processing system comprising a processor and a memory comprising instructions, which are executed by the processor to cause the processor to implement the method of evaluating one or more IR systems, the method comprising: providing, by the processor, a pre-indexed knowledge-based document to a pre-trained sentence identification model; identifying, by the sentence identification model, a predetermined number of query-worthy sentences from the pre-indexed knowledge-based document, wherein the query-worthy sentences are ranked based on a prediction probability value of each query-worthy sentence; providing, by the sentence identification model, the query-worthy sentences to a pre-trained query generation model; generating, by the query generation model, a query for each query-worthy sentence; and evaluating, by the processor, the one or more IR systems using the generated queries, wherein one or more searches are performed via the one or more IR systems, and the one or more searches are performed in a set of knowledge-based documents including the pre-indexed knowledge-based document.

Embodiments further provide a method of evaluating one or more IR systems, further comprising: training, by the processor, the sentence identification model using ground truth, wherein the ground truth includes a plurality of ground truth tuples, each ground truth tuple including a second knowledge-based document, a plurality of second query-worthy sentences identified from the second knowledge-based document, and a plurality of second queries, wherein each second query corresponds to a second query-worthy sentence; and training, by the processor, the query generation model using the ground truth.

Embodiments further provide a method of evaluating one or more IR systems, further comprising: collecting, by the processor, the ground truth through a first round of crowd-sourcing tasks, wherein the plurality of second query-worthy sentences are identified by one or more crowd workers, and the plurality of second queries are written in a natural language by the one or more crowd workers.

Embodiments further provide a method of evaluating one or more IR systems, further comprising: validating, by the processor, the ground truth through a second round of crowdsourcing tasks, wherein a plurality of validation sentences are identified by the one or more crowd workers, and compared with the plurality of second query-worthy sentences, if the plurality of validation sentences are consistent with the plurality of second query-worthy sentences, the plurality of second query-worthy sentences are included into the ground truth.

Embodiments further provide a method of evaluating one or more IR systems, wherein the sentence identification model is trained using one or more features including a location of each query-worthy sentence within the second knowledge-based document, a plurality of entities in each query-worthy sentence, a type of a knowledge concept, and a plurality of properties of the knowledge concept.

Embodiments further provide a method of evaluating one or more IR systems, wherein the plurality of properties of the knowledge concept are obtained via Freebase.

Embodiments further provide a method of evaluating one or more IR systems, wherein the query is generated using a plurality of pre-defined templates.

Embodiments further provide a method of evaluating one or more IR systems, wherein the query generation model is an a sequence to sequence model.

Embodiments further provide a method of evaluating one or more IR systems, wherein the one or more IR systems are evaluated via one or more matrices including precision@1, recall@5, and recall@10.

In another illustrative embodiment, a computer program product comprising a computer usable or readable medium having a computer readable program is provided. The computer readable program, when executed on a processor, causes the processor to perform various ones of, and combinations of, the operations outlined above with regard to the method illustrative embodiment.

In yet another illustrative embodiment, a system is provided. The system may comprise a processor configured to perform various ones of, and combinations of, the operations outlined above with regard to the method illustrative embodiments.

Additional features and advantages of this disclosure will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawing embodiments that are presently preferred, it being understood, however, that the invention is not limited to the specific instrumentalities disclosed. Included in the drawings are the following Figures:

FIG. 1 illustrates an exemplary WIKI page detailing "David Beckham," according to embodiments herein;

DETAILED DESCRIPTION OF EXEMPLARY EMBODIMENTS

Embodiments of the present invention may be a system, a method, and/or a computer program product. The computer program product may include a computer readable storage medium (or media) having computer readable program instructions thereon for causing a processor to carry out aspects of the present invention.

In an embodiment, a system, method, and computer program product can enable evaluation of one or more knowledge-based IR systems via a set of auto-generated queries. The system, method, and computer program product allow IR developers or users to evaluate knowledge-based IR systems in a natural language. In an embodiment, a corpus of knowledge-based documents are provided and indexed by a particular IR system (e.g. a search engine). From the corpus of indexed documents, a ground truth collector can collect natural language queries, candidate sentences (i.e., sentences which may contain answers in response to natural language queries), and indexed documents containing the candidate sentences as ground truth. The ground truth is collected using a crowdsourcing-based method. After being trained by the collected ground truth, a sentence selector can identify the top N candidate sentences ("N" is a predetermined number) from a new knowledge-based document (e.g. a WIKI page), based on a set of features. In an embodiment, the set of features can include sentence location, entities involved in the sentence, a type of target knowledge concept (i.e., a knowledge concept which is a targeted result of a query, e.g., "David Beckham"), and target concept properties, etc. The top N candidate sentences are then provided to the query generator, which uses a query generation model for automatic query generation. With one or more automatically generated queries, the candidate sentences, and the target knowledge-based document as the ground truth, the evaluator can then evaluate and compare the performance of different IR systems based on a number of matrices, such as precision@1, recall@5, recall@10, etc.

FIG. 1 illustrates an exemplary WIKI page detailing "David Beckham," according to embodiments herein. In this example, a couple of query-worthy sentences (also called candidate sentences) in the document having a knowledge concept "David Beckham" are highlighted (e.g., bolded and underlined) by crowd workers. The natural language queries written by crowd workers corresponding to these highlighted query-worthy sentences include "British soccer player known for free kick," "when was David Beckham born," "Manchester United 7," "How many kids did Beckham have," "Beckham spouse," "Beckham teams," etc.

Figure 2:
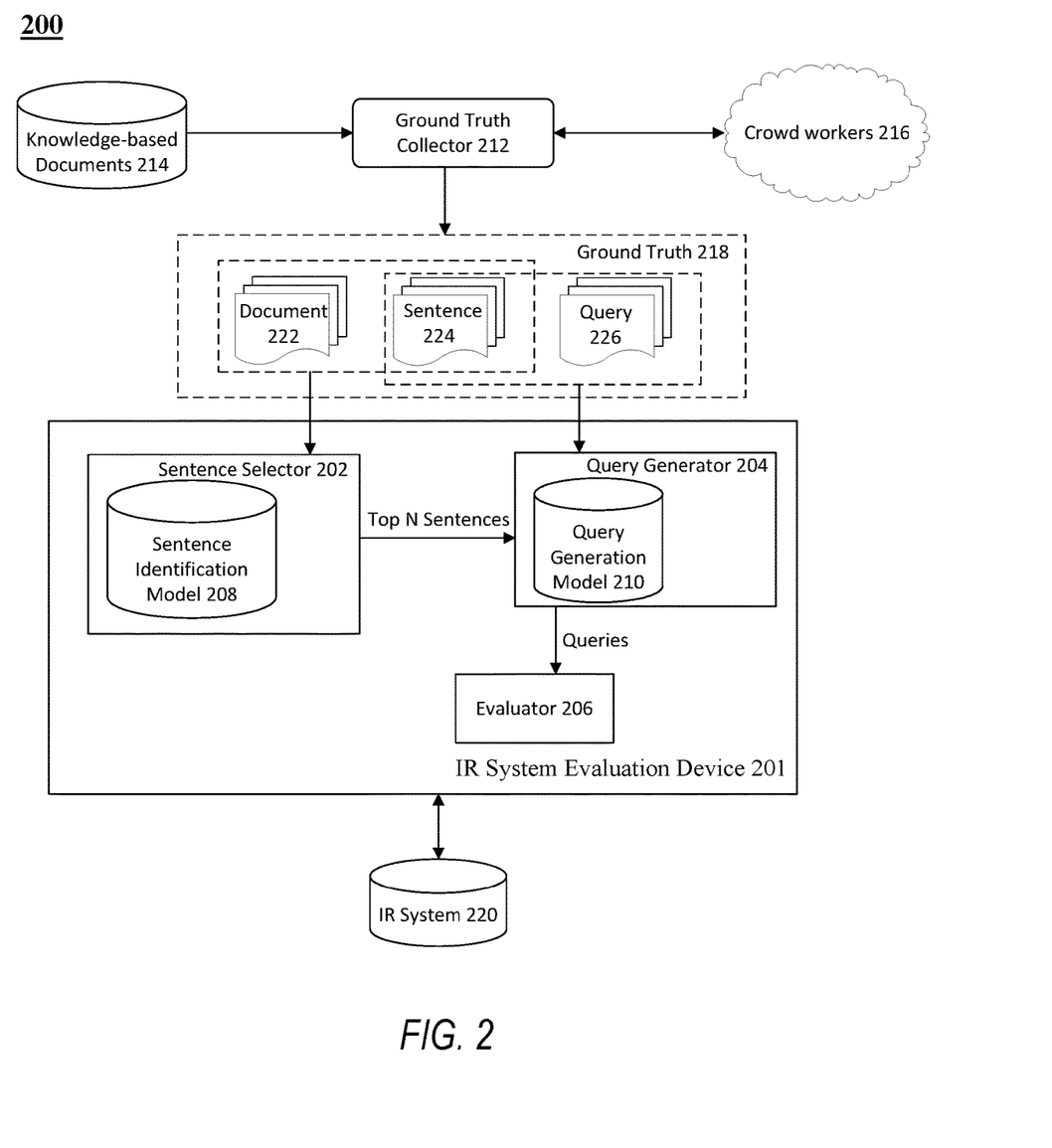
FIG. 2 depicts a block diagram of an exemplary IR system evaluation architecture 200, including IR system evaluation device 201, according to embodiments herein.

FIG. 2 depicts a block diagram of an exemplary IR system evaluation architecture 200, including IR system evaluation device 201. As shown in FIG. 2, the IR system evaluation architecture 200 includes the IR system evaluation device 201, the ground truth collector 212, the knowledge-based documents 214, and IR system 220. The IR system evaluation device 201 further includes the sentence selector 202, the query generator 204, and the evaluator 206.

The sentence selector 202 is configured to automatically identify query-worthy sentences from a knowledge-based document through a pre-trained sentence identification model 208. The sentence identification model 208 is trained based on the ground truth tuple of <document/target concept, query-worthy sentences, natural language queries> collected by the ground truth collector 212. The query-worthy sentences are informative, and contain information which most of users of IR systems may be interested in, and would possibly query.

In an embodiment, the ground truth collector 212 is configured to collect ground truth, which is used to train the sentence selector 202 and the query generator 204. In the embodiment as illustrated in FIG. 2, the ground truth collector 212 is separate from the IR system evaluation device 201. In another embodiment, the ground truth collector 212 can be a part of the IR system evaluation device 201. The trained sentence selector 202 can automatically identify N sentences ("N" is a predetermined number) that could be query-worthy from a knowledge-based document. The trained query generator 204 can automatically create one or more queries for each query-worthy sentence.

In an embodiment, the ground truth collector 212 can perform crowdsourcing tasks for a corpus of knowledge-based documents 214 (e.g., WIKI documents such as "https://en.wikipedia.org/wiki/IBM", and "https://en.wikipedia.org/wiki/David_Beckham", etc.). Specifically, a knowledge concept (e.g. "IBM" or "David Beckham") is presented to crowd workers 216, who are required to read through the content on a document 222 (e.g. a WIKI page), identify top N sentences 224 that could be query-worthy within this document, and write one or more queries 226 in natural language corresponding to each query-worthy sentence 224. The document 222, the top N query-worthy sentences 224, and the corresponding one or more queries 226 are collected as ground truth 218. In this way, a large number of documents 222, top N query-worthy sentences 224 in each document, one or more queries 226 corresponding to each query-worthy sentence are collected as ground truth 218 for machine learning training. In an embodiment, to validate the collected query-worthy sentences and queries, the ground truth collector 212 can perform another round of crowdsourcing tasks. Specifically, the queries written in the first round of crowdsourcing tasks and the document corresponding to the queries are provided to the crowd workers 216, requesting him/her to highlight sentences containing the answers to the queries. If the highlighted sentences are consistent with the query-worthy sentences collected during the first round of crowdsourcing tasks, then the collected tuples of <document 222, query-worthy sentences 224, natural language queries 226> are treated as valid and can be included in ground truth.

In an embodiment, possible features for training the sentence identification model 208 include location of each query-worthy sentence within a document, or within a section of a document, named entities in each query-worthy sentence, the target concept type and its properties, etc. The named entities are real-world objects, such as persons, locations, organizations, products, etc., that can be denoted with a proper name. Examples of the named entities include "Barack Obama," "New York City," "Volkswagen Golf," or anything else that can be named.

In an embodiment, query-worthy sentences tend to appear more towards the beginning of a document, or the beginning of one section of the document, or appear within one or more tables of the document in a more summarized manner.

In another embodiment, named entities are also used for training the sentence identification model 208. The named entities related features include the number of entities within each query-worthy sentence, entity types, local weighted entity importance, and global weighted entity importance. As to the local weighted entity importance, if an entity appears more within the document, the entity is more important and has higher local weight. As to the global weighted entity importance, entities of all the documents used for training the sentence identification model 208 can be linked into a graph. Within an entity linkage graph, an entity having more linkages is more important and has higher global weight. In an embodiment, a list of entities extracted from the knowledge-based documents 214 are stored and used for training the sentence identification model 208.

In a further embodiment, properties of the target knowledge concept can also be used for training the sentence identification model 208 to identify query-worthy sentences. The properties of the knowledge concept can be obtained via a knowledge base, such as Freebase. In Freebase, a property is defined as a relation that describes a relationship between an object (concept/entity) and another object (concept/entity). For example, the property "date of birth" links "Barack Obama" to "1960" (https://www.wikidata.org/wiki/Q76), the property "spouse" links "David Beckham" to "Victoria Adams" (https://www.wikidata.org/wiki/Q10520), and the property "capital" links "Rome" to "Italy" (https://www.wikidata.org/wiki/Q38). In an embodiment, a predetermined number of properties, e.g., the top M properties for each knowledge concept type that appear most frequently in the collected query-worthy sentences, are identified. The knowledge concept type refers to a category of the target knowledge concept. For example, the knowledge concept "Barack Obama" has two types "/people/person" and "/government/us_president." As an example, the top few properties related to the type "/people/person" can be "date of birth," "spouse," "nationality," "friendOf," and "profession." As another example, the top few properties related to the type "location" could be "locatedIn," "capital," "adjoins," and "administrative_division." Any sentence containing any of the corresponding properties will be assigned with higher weight when ranking sentences in a document.

In an embodiment, several features including location of each query-worthy sentence within a document, or within a section of a document, named entities in each query-worthy sentence, a target concept type and its properties, are extracted from each query-worthy sentence of a target document. All highlighted sentences (i.e., query-worthy sentences) in ground truth are positive training instances. Non-highlighted sentences (i.e., non-query-worthy sentences) are randomly sampled as negative training instances. The sentence identification model 208 is trained based on the features to differentiate the positive instances from the negative instances. In an example, the sentence identification model 208 is a support-vector machine (SVM) model, and the identified query-worthy sentences are ranked based on a value of prediction probability. The prediction probability indicates how likely the prediction of a query-worthy sentence is correct. For instance, sentence A is a query-worthy sentence having a prediction probability of 0.90, while sentence B is a query-worthy sentence having a prediction probability of 0.75, then the sentence A will be ranked higher than the sentence B.

Figure 3:
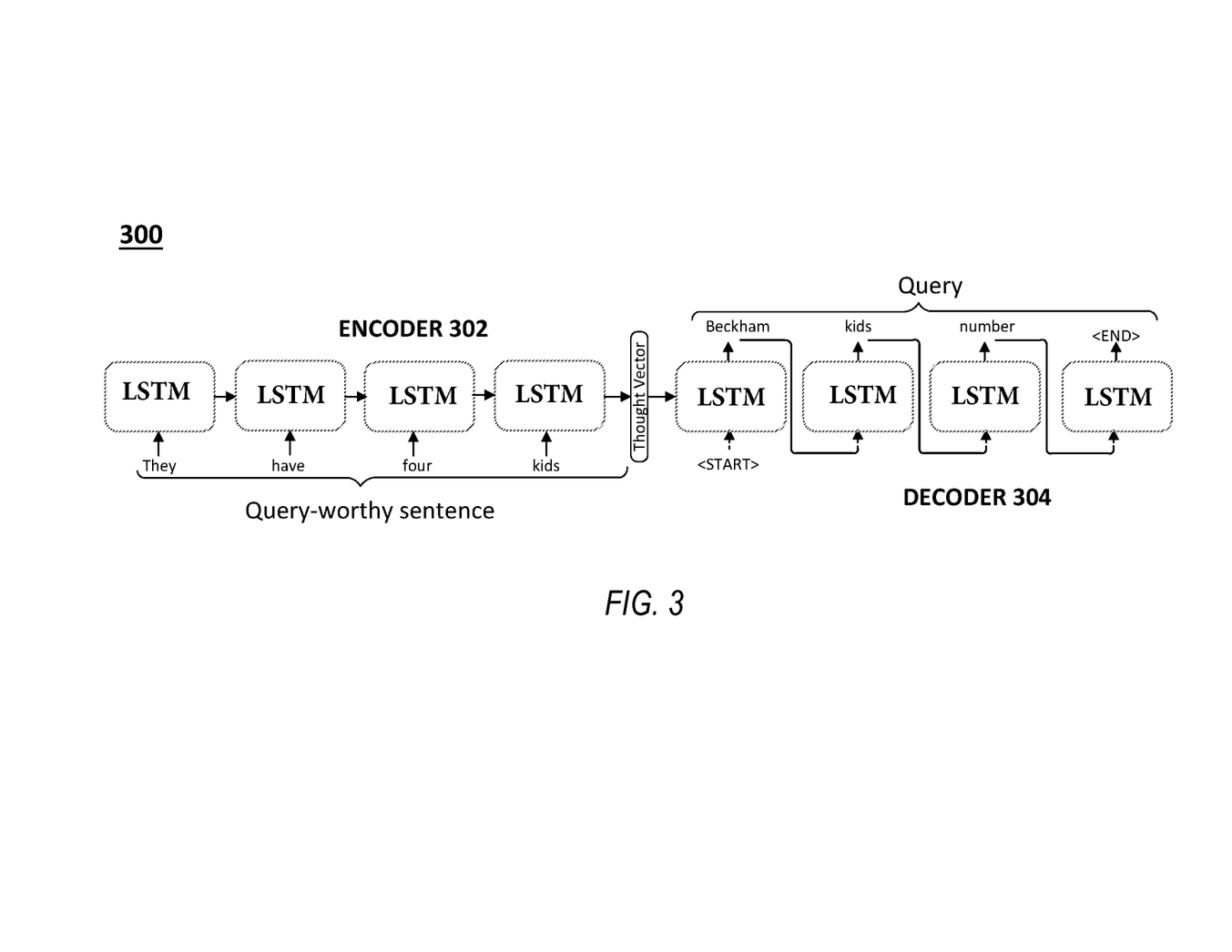
FIG. 3 illustrates an exemplary encoder-decoder LSTM 300 for automatic query generation, according to embodiments herein.

A set of query-worthy sentences identified by the sentence selector 202 are provided to the query generator 204, which is configured to generate queries using a pre-trained query generation model 210. The query generation model 210 is pre-trained by the query-worthy sentences, and queries manually created by the crowd workers 216. There are various embodiments of implementing the query generator 204. In an embodiment, a template-based approach, which extracts key entities from each query-worthy sentence and combines the key entities using pre-defined templates. In an example, the pre-defined templates are manually constructed, and then the manually constructed templates are applied to generate queries or questions. In another embodiment, FIG. 3 illustrates an exemplary encoder-decoder LSTM 300 for automatic query generation, according to embodiments herein. A sequence to sequence model, e.g., an encoder-decoder Long Short-Term Memory Networks (LSTM) 300 is utilized to work as the query generation model 210. The encoder-decoder LSTM model 300 can be divided into two sub-models, i.e., the encoder model 302 configured for outputting a fixed-length encoding of an input sequence (a query-worthy sentence), and the decoder model 304 configured for predicting an output sequence (a query corresponding to the input query-worthy sentence), one word per LSTM unit. In another embodiment, the sequence to sequence model can be an encoder-decoder Recurrent Neural Network (RNN), one word per RNN unit.

After obtaining generated queries regarding each target concept/document from the query generator 204, the evaluator 206 is configured to automatically evaluate the performance of one or more IR systems 220. The evaluator 206 searches in a large number of indexed documents using each generated query (only one ground truth document corresponds to each generated query) and evaluates the performance of each IR system via matrices, such as precision@1, recall@5, and recall@10. Precision@1 measures if the first returned document is the ground truth document (i.e., the target document containing an answer to the corresponding query). Recall @5 and recall@10 measure if the returned 5 and 10 documents include the ground truth document.

Figure 4:
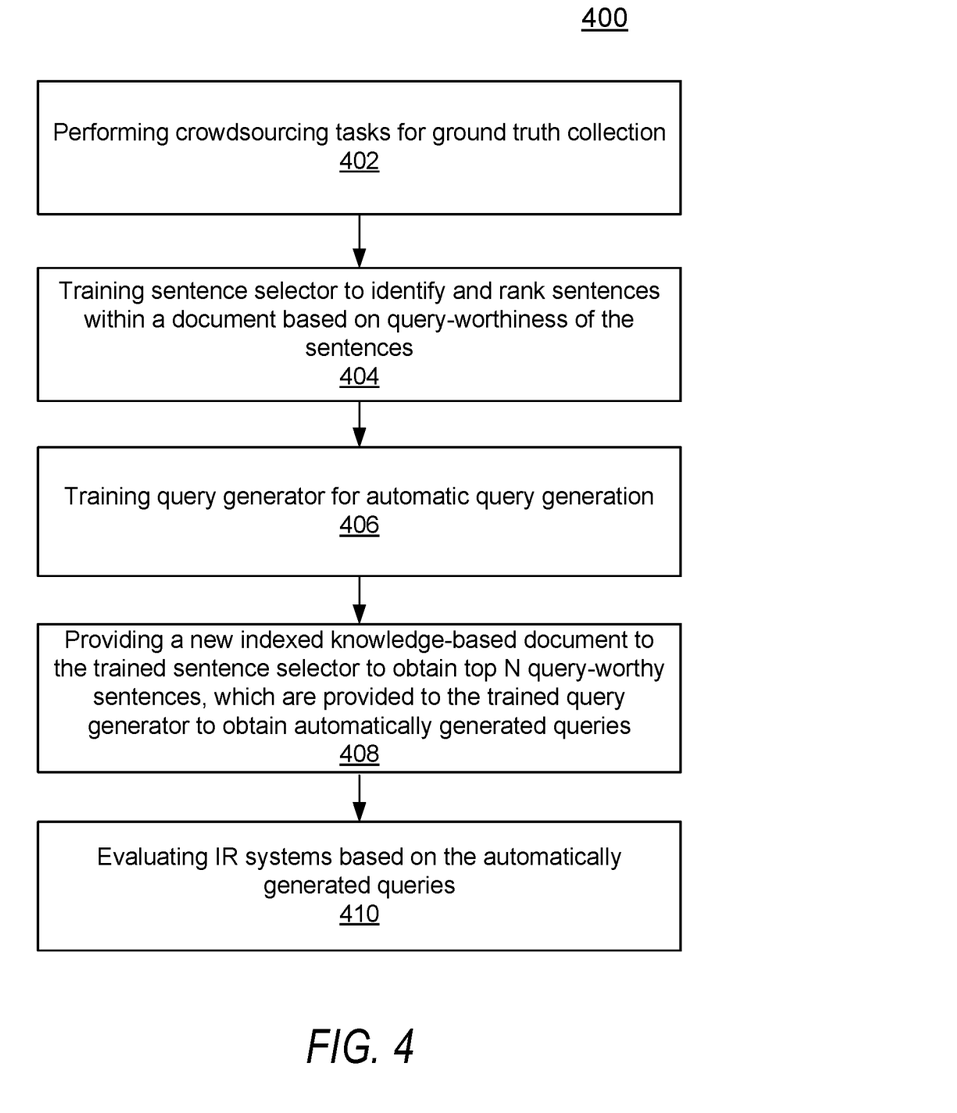
FIG. 4 is an exemplary flowchart illustrating a method 400 of evaluating one or more IR systems, according to embodiments herein.

FIG. 4 is an exemplary flowchart illustrating a method 400 of evaluating one or more IR systems, according to embodiments herein. At step 402, crowdsourcing tasks are performed to obtain<document/knowledge concept, query-worthy sentences, natural language queries> ground truth collection. Specifically, a document/knowledge concept is provided to one or more crowd workers, requesting the crowd workers to highlight top N query-worthy sentences, and write queries in natural language corresponding to each query-worthy sentence. In an embodiment, the collected ground truth is validated through another round of crowdsourcing tasks. Specifically, the queries written in the first round of crowdsourcing tasks and the document are provided to the crowd workers, requesting them to highlight sentences containing answers to the queries. If the highlighted sentences are consistent with the query-worthy sentences collected during the first round of crowdsourcing tasks, then the collected tuples of <document, query-worthy sentences, natural language queries> are valid and can work as ground truth. Crowd workers can be either IR experts or ordinary people without IR knowledge.

At step 404, the sentence identification model 208 in the sentence selector 202 is trained to identify and rank sentences within a document based on query-worthiness of the sentences. Features used for training the sentence identification model 208 include location of the sentence within a document, or within a section of the document, the number of entities within the sentence, entity types, local weighted entity importance (measured based on the number of each entity within a document), global weighted entity importance (measured through graph-based entity linkage analysis), target concept type, and properties of each target concept. The sentence identification model 208 is further trained to rank the sentences based on their prediction probabilities associated with query-worthiness.

At step 406, the query generation model 210 is trained for automatic query generation. In an embodiment, the query generation model 210 is a sequence to sequence model, e.g., an encoder-decoder LSTM model, with query-worthy sentences as an input sequence and natural language queries as an output sequence.

The sentence identification model 208 and the query generation model 210 are both machine learning models. Machine learning, also referred to as "artificial intelligence," is a group of techniques that allows computers to not only process data faster than humans, but also to process data more intelligently. A machine learning model allows a computer to observe large collections of data elements and provide accurate predictions on the occurrence of future events. A machine learning model can be either supervised machine learning model or unsupervised machine learning model. Examples for machine learning algorithms include but not limited to: deep learning, neural network, logistic regression, support vector machines, reinforcement learning, etc.

At step 408, a new indexed knowledge-based document is provided to the trained sentence identification model 208, which automatically extracts a predetermined number of query-worthy sentences from the new document. The query-worthy sentences are ranked based on prediction probability values. The automatically extracted query-worthy sentences are then provided to the query generation model 210, which automatically generates a query for each query-worthy sentence.

At step 410, one or more IR systems 220 are evaluated based on the automatically generated queries. Searches are performed via different IR systems 220 in a pre-indexed set of knowledge-based documents including the new document (target document) of the step 408. The searches are performed using queries automatically generated in the step 408. Various measurement matrices, e.g., precicion@1, recall@5, and recall@10, etc., are introduced for IR system evaluation.

Figure 5:
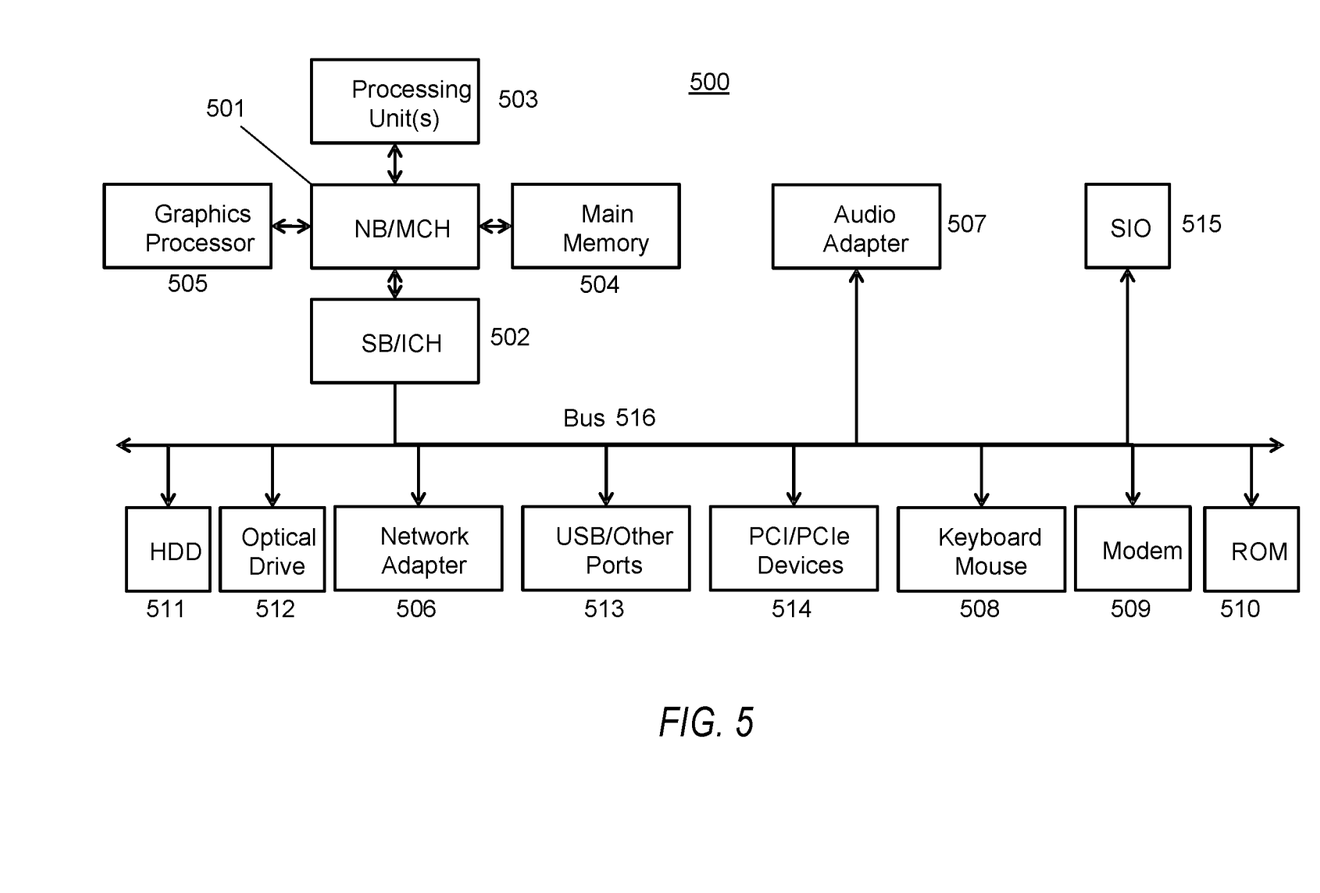
FIG. 5 is a block diagram of an exemplary data processing system 500 in which aspects of the illustrative embodiments may be implemented.

FIG. 5 is a block diagram of an exemplary data processing system 500 in which aspects of the illustrative embodiments may be implemented. The data processing system 500 is an example of a computer, such as a server or client, in which computer usable code or instructions implementing the process for illustrative embodiments of the present invention are located. In one embodiment, FIG. 5 may represent a server computing device.

In the depicted example, data processing system 500 may employ a hub architecture including a north bridge and memory controller hub (NB/MCH) 501 and south bridge and input/output (I/O) controller hub (SB/ICH) 502. Processing unit 503, main memory 504, and graphics processor 505 may be connected to the NB/MCH 501. Graphics processor 505 may be connected to the NB/MCH 501 through an accelerated graphics port (AGP) (not shown in FIG. 5).

In the depicted example, the network adapter 506 connects to the SB/ICH 502. The audio adapter 507, keyboard and mouse adapter 508, modem 509, read only memory (ROM) 510, hard disk drive (HDD) 511, optical drive (CD or DVD) 512, universal serial bus (USB) ports and other communication ports 513, and the PCI/PCIe devices 514 may connect to the SB/ICH 502 through bus system 516. PCI/PCIe devices 514 may include Ethernet adapters, add-in cards, and PC cards for notebook computers. ROM 510 may be, for example, a flash basic input/output system (BIOS). The HDD 511 and optical drive 512 may use an integrated drive electronics (IDE) or serial advanced technology attachment (SATA) interface. The super I/O (SIO) device 515 may be connected to the SB/ICH 502.

An operating system may run on processing unit 503. The operating system could coordinate and provide control of various components within the data processing system 500. As a client, the operating system may be a commercially available operating system. An object-oriented programming system, such as the Java™ programming system, may run in conjunction with the operating system and provide calls to the operating system from the object-oriented programs or applications executing on data processing system 500. As a server, the data processing system 500 may be an IBM® eServer™ System P® running the Advanced Interactive Executive operating system or the Linux operating system. The data processing system 500 may be a symmetric multiprocessor (SMP) system that may include a plurality of processors in the processing unit 503. Alternatively, a single processor system may be employed.

Instructions for the operating system, the object-oriented programming system, and applications or programs are located on storage devices, such as the HDD 511, and are loaded into the main memory 504 for execution by the processing unit 503. The processes for embodiments of the generation system may be performed by the processing unit 503 using computer usable program code, which may be located in a memory such as, for example, main memory 504, ROM 510, or in one or more peripheral devices.

A bus system 516 may be comprised of one or more busses. The bus system 516 may be implemented using any type of communication fabric or architecture that may provide for a transfer of data between different components or devices attached to the fabric or architecture. A communication unit such as the modem 509 or network adapter 506 may include one or more devices that may be used to transmit and receive data.

Those of ordinary skill in the art will appreciate that the hardware depicted in FIG. 5 may vary depending on the implementation. Other internal hardware or peripheral devices, such as flash memory, equivalent non-volatile memory, or optical disk drives may be used in addition to or in place of the hardware depicted. Moreover, the data processing system 500 may take the form of a number of different data processing systems, including but not limited to, client computing devices, server computing devices, tablet computers, laptop computers, telephone or other communication devices, personal digital assistants, and the like. Essentially, the data processing system 500 may be any known or later developed data processing system without architectural limitation.

The computer readable storage medium may be a tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a head disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network (LAN), a wide area network (WAN), and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on a remote computer, or entirely on the remote computer or server. In the latter scenario, the remote computer may be connected to the user's computer through any type of network, including LAN or WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical functions. In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts or carry out combinations of special purpose hardware and computer instructions.

The present description and claims may make use of the terms "a," "at least one of," and "one or more of," with regard to particular features and elements of the illustrative embodiments. It should be appreciated that these terms and phrases are intended to state that there is at least one of the particular feature or element present in the particular illustrative embodiment, but that more than one may also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. It will be apparent to those of ordinary skill in the art, in view of the present description, that there are many other alternative implementations for these various elements that may be utilized in addition to, or in replacement of, the examples provided herein without departing from the spirit and scope of the present invention.

The system and processes of the figures are not exclusive. Other systems, processes, and menus may be derived in accordance with the principles of embodiments described herein to accomplish the same objectives. It is to be understood that the embodiments and variations shown and described herein are for illustration purposes only. Modifications to the current design may be implemented by those skilled in the art, without departing from the scope of the embodiments. As described herein, the various systems, subsystems, agents, managers and processes may be implemented using hardware components, software components, and/or combinations thereof. No claim element herein is to be construed under the provisions of 35 U.S.C. 112 (f) unless the element is expressly recited using the phrase "means for."

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

What is claimed is:

1. A computer implemented method in a data processing system comprising a processor and a memory comprising instructions, which are executed by the processor to cause the processor to implement the method of evaluating one or more information retrieval ("IR") systems, the method comprising:

receiving, by the processor, ground truth, wherein the ground truth is collected through a first round of crowdsourcing tasks, wherein the ground truth comprises a plurality of second query-worthy sentences identified by one or more crowd workers and a plurality of second queries written in a natural language by the one or more crowd workers;

validating, by the processor, the ground truth through a second round of crowdsourcing tasks, wherein the validation comprises:

comparing a plurality of validation sentences identified by the one or more crowd workers with the plurality of second query-worthy sentences, and including one of the plurality of second query-worthy sentences in the ground truth when one of the plurality of validation sentences is consistent with a corresponding one of the plurality of second query-worthy sentences;

training, by the processor, a sentence identification model using the validated ground truth to identify the query-worthy sentences, wherein the ground truth includes a plurality of ground truth tuples, each ground truth tuple including a second knowledge-based document, the plurality of second query-worthy sentences identified from the second knowledge-based document, and the plurality of second queries, wherein each second query corresponds to a second query-worthy sentence;

providing, by the processor, a pre-indexed knowledge-based document to the trained sentence identification model, wherein the trained sentence identification model is a first machine learning model;

identifying, by the sentence identification model, a predetermined number of query-worthy sentences from the pre-indexed knowledge-based document, wherein the query-worthy sentences are ranked based on a prediction probability value of each query-worthy sentence, wherein each of the query-worthy sentences are a sentence that contains an answer in response to a natural language query;

training, by the processor, a query generation model using the validated ground truth to generate the query for each query-worthy sentence;

providing, by the sentence identification model, the query-worthy sentences to the trained query generation model, wherein the trained query generation model is a second machine learning model;

generating, by the query generation model, a query for each query-worthy sentence; and evaluating, by the processor, the one or more IR systems using the generated queries, wherein one or more searches are performed via the one or more IR systems, and the one or more searches are performed in a set of knowledge-based documents including the pre-indexed knowledge-based document.

2. The method as recited in claim 1, wherein the sentence identification model is trained using one or more features including a location of each query-worthy sentence within the second knowledge-based document, a plurality of entities in each query-worthy sentence, a type of a knowledge concept, and a plurality of properties of the knowledge concept.

3. The method as recited in claim 2, wherein the plurality of properties of the knowledge concept are obtained via Freebase.

4. The method as recited in claim 1, wherein the query is generated using a plurality of pre-defined templates.

5. The method as recited in claim 1, wherein the query generation model is a sequence to sequence model.

6. The method as recited in claim 1, wherein the evaluation of the one or more IR systems comprises evaluating the one or more IR systems using one or more matrices including precision@1, recall@5, and recall@10.

7. A computer program product for evaluating one or more information retrieval ("IR") systems, the computer program product comprising a computer readable storage medium having program instructions embodied therewith, the program instructions executable by a processor to cause the processor to:

receive, by the processor, ground truth, wherein the ground truth is collected through a first round of crowdsourcing tasks, wherein the ground truth comprises a plurality of second query-worthy sentences identified by one or more crowd workers and a plurality of second queries written in a natural language by the one or more crowd workers;

validate, by the processor, the ground truth through a second round of crowdsourcing tasks, wherein the validation comprises:
  comparing a plurality of validation sentences identified by the one or more crowd workers with the plurality of second query-worthy sentences, and
  including one of the plurality of second query-worthy sentences in the ground truth when one of the plurality of validation sentences is consistent with a corresponding one of the plurality of second query-worthy sentences;

train, by the processor, a sentence identification model using the validated ground truth to identify the query-worthy sentences, wherein the ground truth includes a plurality of ground truth tuples, each ground truth tuple including a second knowledge-based document, the plurality of second query-worthy sentences identified from the second knowledge-based document, and the plurality of second queries, wherein each second query corresponds to a second query-worthy sentence;

provide a pre-indexed knowledge-based document to the trained sentence identification model, wherein the trained sentence identification model is a first machine learning model;

identify, by the sentence identification model, a predetermined number of query-worthy sentences from the pre-indexed knowledge-based document, wherein the query-worthy sentences are ranked based on a prediction probability value of each query-worthy sentence, wherein each of the query-worthy sentences are a sentence that contains an answer in response to a natural language query;

train, by the processor, a query generation model using the validated ground truth to generate the query for each query-worthy sentence;

provide, by the sentence identification model, the query-worthy sentences to the trained query generation model, wherein the trained query generation model is a second machine learning model;

generate, by the query generation model, a query for each query-worthy sentence; and evaluate the one or more IR systems using the generated queries, wherein one or more searches are performed via the one or more IR systems, and the one or more searches are performed in a set of knowledge-based documents including the pre-indexed knowledge-based document.

8. The computer program product as recited in claim 7, wherein the sentence identification model is trained using one or more features including a location of each query-worthy sentence within the second knowledge-based document, a plurality of named entities in each query-worthy sentence, a type of a knowledge concept, and a plurality of properties of the knowledge concept.

9. The computer program product as recited in claim 8, wherein the set of knowledge-based documents are all WIKI documents.

10. The computer program product as recited in claim 8, wherein features related to the plurality of named entities include the number of entities within each query-worthy sentence, entity types, local weighted entity importance, and global weighted entity importance.

11. A system for evaluating one or more information retrieval ("IR") systems, comprising:
  a processor configured to:
    receive, by the processor, ground truth, wherein the ground truth is collected through a first round of crowdsourcing tasks, wherein the ground truth comprises a plurality of second query-worthy sentences identified by one or more crowd workers and a plurality of second queries written in a natural language by the one or more crowd workers;
    validate, by the processor, the ground truth through a second round of crowdsourcing tasks, wherein the validation comprises:
      comparing a plurality of validation sentences identified by the one or more crowd workers with the plurality of second query-worthy sentences, and
      including one of the plurality of second query-worthy sentences in the ground truth when one of the plurality of validation sentences is consistent with a corresponding one of the plurality of second query-worthy sentences;
    train, by the processor, a sentence identification model using the validated ground truth to identify the query-worthy sentences, wherein the ground truth includes a plurality of ground truth tuples, each ground truth tuple including a second knowledge-based document, the plurality of second query-worthy sentences identified from the second knowledge-based document, and the plurality of second queries, wherein each second query corresponds to a second query-worthy sentence;
    provide a pre-indexed knowledge-based document to the trained sentence identification model, wherein the trained sentence identification model is a first machine learning model;
    identify, by the sentence identification model, a predetermined number of query-worthy sentences from the pre-indexed knowledge-based document, wherein the query-worthy sentences are ranked based on a prediction probability value of each query-worthy sentence, wherein each of the query-worthy sentences are a sentence that contains an answer in response to a natural language query;
    train, by the processor, a query generation model using the validated ground truth to generate the query for each query-worthy sentence;
    provide, by the sentence identification model, the query-worthy sentences to the trained query generation model, wherein the trained query generation model is a second machine learning model;
    generate, by the query generation model, a query for each query-worthy sentence; and
    evaluate the one or more IR systems using the generated queries, wherein one or more searches are performed via the one or more IR systems, and the one or more searches are performed in a set of knowledge-based documents including the pre-indexed knowledge-based document.

* * * * *